(12) United States Patent
Takagi (10) Patent No.: US 9,818,513 B2
(45) Date of Patent: Nov. 14, 2017

(54) RFEB-BASED MAGNET AND METHOD FOR PRODUCING RFEB-BASED MAGNET

(71) Applicant: Shinobu Takagi, Aichi (JP)

(72) Inventor: Shinobu Takagi, Aichi (JP)

(73) Assignee: DAIDO STEEL CO., LTD., Aichi (JP)

(*) Notice: Subject to any disclaimer, the term of this patent is extended or adjusted under 35 U.S.C. 154(b) by 238 days.

(21) Appl. No.: 14/502,056

(22) Filed: Sep. 30, 2014

(65) Prior Publication Data
US 2015/0097643 A1    Apr. 9, 2015

(30) Foreign Application Priority Data

Oct. 4, 2013  (JP) ................................. 2013-208936

(51) Int. Cl.
*H01F 1/01*   (2006.01)
*H01F 7/02*   (2006.01)
(Continued)

(52) U.S. Cl.
CPC .............. *H01F 1/01* (2013.01); *B23K 20/02* (2013.01); *B23K 20/026* (2013.01); *B23K 20/16* (2013.01);
(Continued)

(58) Field of Classification Search
None
See application file for complete search history.

(56) References Cited

U.S. PATENT DOCUMENTS

2012/0229239 A1\*  9/2012  Urda ........................ B22F 7/008
                                                    335/302
2013/0049909 A1\*  2/2013  Sweeney ............. H01F 41/0266
                                                    335/302
(Continued)

FOREIGN PATENT DOCUMENTS

CN    102684323 A    9/2012
JP    2006-19521 A   1/2006
(Continued)

OTHER PUBLICATIONS

Hioki et al., "Development of Dy-omitted Nd—Fe—B-based hot worked magnet by using a rapidly quenched powder as a raw material", General Incorporation Foundation of Sokeizai Center, Aug. 2011, pp. 19 to 24, vol. 52, No. 8.
(Continued)

*Primary Examiner* — Xiaowei Su
(74) *Attorney, Agent, or Firm* — Greenblum & Bernstein, P.L.C.

(57) ABSTRACT

Provided is a combined type RFeB-based magnet, including: a first unit magnet; a second unit magnet; and an interface material that bonds the first unit magnet and the second unit magnet, in which the first unit magnet and the second unit magnet are RFeB-based magnets containing a light rare earth element $R^L$ that is at least one element selected from the group consisting of Nd and Pr, Fe, and B, in which the interface material contains at least one compound selected from the group consisting of a carbide, a hydroxide, and an oxide of the light rare earth element $R^L$, and in which an amount of a heavy rare earth element $R^H$ that is at least one element selected from the group consisting of Dy, Tb and Ho in the second unit magnet is more than that in the first unit magnet.

6 Claims, 4 Drawing Sheets

(51) Int. Cl.
    *H01F 41/02* (2006.01)
    *B23K 20/02* (2006.01)
    *C22C 38/00* (2006.01)
    *B23K 20/16* (2006.01)
    *B23K 20/233* (2006.01)
    *B23K 101/06* (2006.01)
    *H01F 1/057* (2006.01)
    *B23K 103/00* (2006.01)
    *B23K 103/08* (2006.01)

(52) U.S. Cl.
    CPC .......... *B23K 20/233* (2013.01); *C22C 38/002* (2013.01); *C22C 38/005* (2013.01); *H01F 7/02* (2013.01); *H01F 7/021* (2013.01); *H01F 41/0293* (2013.01); *B23K 2201/06* (2013.01); *B23K 2203/08* (2013.01); *B23K 2203/50* (2015.10); *C22C 2202/02* (2013.01); *H01F 1/0576* (2013.01); *H01F 1/0577* (2013.01)

(56) References Cited

U.S. PATENT DOCUMENTS

2015/0041022 A1    2/2015   Komura et al.
2015/0097642 A1*   4/2015   Takagi ................. B23K 20/026
                                                          335/306
2016/0297028 A1*  10/2016   Sagawa ................... B22F 7/064

FOREIGN PATENT DOCUMENTS

| JP | 2006-303197 A | 11/2006 |
| JP | 2006-303433 A | 11/2006 |
| JP | 2007-273815 A | 10/2007 |
| JP | 2007258455 A  | 10/2007 |
| JP | 2009-224413 A | 10/2009 |
| JP | 2012-191211 A | 10/2012 |
| WO | 2013/061836 A | 5/2013  |

OTHER PUBLICATIONS

Chinese Office Action in respect to Chinese Application No. 201410508512.9 with English Translation, dated Jun. 27, 2017.

Japanese Notification of Reasons for Refusal in Japanese Application No. 2013-208936, dated Aug. 8, 2017, with English Translation.

* cited by examiner

MAGNETIC FIELD

Fig. 3C

HEATING

HEATING

RFEB-BASED MAGNET AND METHOD FOR PRODUCING RFEB-BASED MAGNET

FIELD OF THE INVENTION

The present invention relates to an RFeB-based magnet that contains R (rare earth element), Fe, and B, and a method for producing an RFeB-based magnet.

BACKGROUND OF THE INVENTION

The RFeB-based magnet was found by Sagawa et. al. in 1982, and has an advantage that many magnetic properties such as residual magnetic flux density are higher than that of permanent magnets in the related art. Accordingly, the RFeB-based magnet has been used in various products such as a drive motor of a hybrid car and an electric car, a motor for electrically-assisted bicycles, an industrial motor, a voice coil motor of a hard disk drive and the like, a high-performance speaker, a headphone, and a permanent magnet-type magnetic resonance diagnostic device.

Early RFeB-based magnets have a defect that among various magnetic properties, a coercive force $H_{cj}$ is relatively low. The coercive force represents a force that resists magnetization inversion when a magnetic field (opposing magnetic field) in a direction opposite to a direction of the magnetization is applied to a magnet Generally, as a temperature is raised, an effect of thermal fluctuation increases, and thus a coercive force decreases. Therefore, even when the opposing magnetic field has intensity to a degree in which spontaneous magnetization is not inverted at room temperature, magnetization is apt to be inverted at a certain temperature or higher. In addition, when comparing the same magnets to each other, a magnet having a high coercive force at room temperature also tends to have a high coercive force at a high temperature. This temperature dependency is also true of an RFeB-based magnet. An early RFeB-based magnet may not be used as a magnet such as a magnet for a drive motor of a vehicle which is used in an environment in which a use temperature increases to approximately 200° C.

It has been found that the coercive force is improved by making at least one element selected from the group consisting of Dy, Tb and Ho (hereinafter, at least one element selected from the group consisting of Dy, Tb, and Ho is referred to as a "heavy rare earth element $R^H$") be present inside the RFeB-based magnet. It is considered that the heavy rare earth element $R^H$ has an effect of hindering the above-described magnetization inversion. According to this, an RFeB-based magnet, in which inversion of magnetization does not occur even in a case of being used in a high-temperature environment similar to a drive motor of a vehicle, is obtained.

On the other hand, in the case where an amount of the $R^H$ increases, residual magnetic flux density $B_r$ decreases, and thus there is a problem that the maximum energy product $(BH)_{max}$ also decreases. In addition, the $R^H$ is a rare resource and is expensive, and a production area is localized, and thus it is not preferable to increase the amount of $R^H$.

As a first method of improving the coercive force $H_{cj}$ while suppressing a decrease in the residual magnetic flux density Br, a grain boundary diffusion method is known (For example, refer to Patent Document 1). In the grain boundary diffusion method, a powder which contains the $R^H$ as an elementary substance, a compound, or an alloy, or the like is attached to a surface of the RFeB-based magnet, and the RFeB-based magnet is heated, thereby penetrating the $R^H$ to the inside of the magnet through a grain boundary of the RFeB-based magnet. According to this, atoms of the $R^H$ diffuse only to the vicinity of the surface of respective crystal grains. There is a characteristic that magnetization inversion in a magnet occurs at first in the vicinity of a grain boundary of crystal grains, and diffuses to the inside of the crystal grains from the vicinity of the grain boundary, and thus when the atoms of the $R^H$ are allowed to diffuse in the vicinity of the surface of the crystal grains by the grain boundary diffusion method, it is possible to prevent the magnetization inversion at the grain boundary, and accordingly to this, it is possible to prevent the magnetization inversion of the entirety of the magnet. In addition, it is possible to suppress an amount of the $R^H$ in the entirety of the magnet, and it is possible to prevent a decrease in the residual magnetic flux density $B_r$.

In addition, the RFeB-based magnet is largely classified into (i) a sintered magnet obtained by sintering a raw material alloy powder containing a main phase grain as a main component, (ii) a bonded magnet obtained by tightening raw material alloy powders with a binding agent (binder composed of an organic material such as a polymer and an elastomer) and by molding the tightened powders, and (iii) a hot-plastic worked magnet obtained by performing a hot press working and hot plastic working with respect to a raw material alloy powder (refer to Non-Patent Document 1). Among these magnets, the grain boundary diffusion treatment may be performed in (i) sintered magnet and (iii) hot-plastic worked magnet in which the binder of the organic material is not used and thus heating during the grain boundary diffusion treatment can be performed.

As a second method of improving the coercive force $H_{cj}$ while suppressing a decrease in the residual magnetic flux density $B_r$, there is a method of locally increasing a content rate of the $R^H$ at a portion in which an adverse effect due to the decrease in the coercive force H becomes particularly significant in the entirety of the magnet. For example, with regard to an RFeB-based magnet that is used in a rotor of a motor, Patent Document 2 discloses a configuration in which the content rate of the $R^H$ at a portion in the vicinity of a stator in which a magnetic field is relatively strong in the motor is made to be higher than that of other portions. According to this, it is possible to suppress a decrease in the residual magnetic flux density $B_r$ in the entirety of the magnet while reliably increasing the coercive force at a portion in which it is necessary to improve the coercive force. In Patent Document 2, to locally increase the content rate of the $R^H$ as described above, a method for producing an RFeB-based magnet serving as a rotor of a motor by bonding a plurality of RFeB-based magnets manufactured by using raw materials in which content rates of the $R^H$ are different from each other is used.

[Patent Document 1] JP-A-2006-303433
[Patent Document 2] JP-A-2012-191211
[Patent Document 3] JP-A-2006-019521
[Non-Patent Document 1]"Development of Dy-omitted Nd—Fe—B-based hot worked magnet by using a rapidly quenched powder as a raw material" written by HIOKI Keiko and HATTORI Atsushi, Sokeizai, Vol. 52, No. 8, pages 19 to 24, General Incorporation Foundation of Sokeizai Center, published in August, 2011

SUMMARY OF THE INVENTION

It is preferable to use the second method rather than the first method so as to reliably realize a high coercive force at a portion in which it is necessary to increase the coercive force. However, Patent Document 2 only describes bonding of a plurality of RFeB-based magnets, and does not disclose a specific bonding method. When performing the bonding by using a typical organic adhesive, heat resistance of the resultant RFeB-based magnet is apt to decrease. Particularly, in a drive motor of a vehicle, a temperature is raised to 200° C. or higher during use, and thus the RFeB-based magnet in which bonding is performed with the adhesive cannot be used in this motor.

In addition, in the RFeB-based magnet that is manufactured by the second method, when a temperature is raised during use, a magnetization direction may be inverted at a portion in which a high coercive force is not obtained. That is, it can be said that the RFeB-based magnet manufactured by the second method has low heat resistance in consideration of retention of the magnetization direction.

An object of the invention is to provide an RFeB-based magnet which is capable of locally increasing a content rate of $R^H$ at a portion in which it is necessary to increase a coercive force, and which has high heat resistance.

In order to solve the above-mentioned problem, a combined type RFeB-based magnet according to the invention, including: a first unit magnet; a second unit magnet; and an interface material that bonds the first unit magnet and the second unit magnet, in which the first unit magnet and the second unit magnet are RFeB-based magnets containing a light rare earth element $R^L$ that is at least one element selected from the group consisting of Nd and Pr, Fe, and B, in which the interface material contains at least one compound selected from the group consisting of a carbide, a hydroxide, and an oxide of the light rare earth element $R^L$, and in which an amount of a heavy rare earth element $R^H$ that is at least one element selected from the group consisting of Dy, Tb and Ho in the second unit magnet is more than that in the first unit magnet.

According to the combined type RFeB-based magnet according to the invention, since the second unit magnet is a high $R^H$-concentration unit magnet in which the amount of the $R^H$ is more than that in the first unit magnet, it is possible to obtain a combined type RFeB-based magnet in which a content rate of the $R^H$ is locally high. In addition, two adjacent unit magnets are strongly bonded to each other by an interface material containing at least one compound selected from the group consisting of a carbide, a hydroxide, and an oxide of the light rare earth element $R^L$. The carbide, the hydroxide, the oxide, and the like of the light rare earth element $R^L$ have a melting point higher than that of an organic adhesive, and thus heat resistance is higher than that of a combined type RFeB-based magnet using an organic adhesive in the related art.

The combined type RFeB-based magnet according to the invention can be produced by the following method. That is to say, a method for producing a combined type RFeB-based magnet in which a first unit magnet and a second unit magnet are bonded to each other, and an amount of a heavy rare earth element $R^H$ that is at least one element selected from the group consisting of Dy, Tb and Ho in the second unit magnet is more than that in the first unit magnet, the first unit magnet and the second unit magnet being a sintered magnet or a hot-plastic worked magnet composed of an RFeB-based magnet containing a light rare earth element $R^L$ that is at least one element selected from the group consisting of Nd and Pr, Fe, and B, the method including: a grain boundary diffusion treatment step of heating in a state in which bonding surfaces of the first unit magnet and the second unit magnet are brought into contact with each other through paste obtained by mixing a metal powder containing the heavy rare earth element $R^H$ and an organic material.

According to the method for producing the combined type RFeB-based magnet according to the invention, atoms of the heavy rare earth element $R^H$ contained in the paste diffuse to a grain boundary phase inside each of the unit magnets due to the grain boundary diffusion treatment, and atoms of the light rare earth element $R^L$ of the grain boundary phase inside the unit magnet are substituted with the atoms of the heavy rare earth element $R^H$. According to this, the substituted atoms of the light rare earth element $R^L$ reach the bonding surface of the unit magnet and react with the organic material that is contained in the paste to generate a carbide, a hydroxide, and/or an oxide, whereby an interface material is formed. In addition, in combination with the reaction, the heavy rare earth element $R^H$ that remains inside the paste may react with the organic material to generate a carbide, a hydroxide, and/or an oxide of the heavy rare earth element $R^H$.

The combined type RFeB-based magnet according to the invention can be manufactured by the above-described method, and thus it is possible to make the heavy rare earth element $R^H$ diffuse from the bonding surface to the inside of the unit magnet. According to this, the $R^H$ can be present at the grain boundary and the vicinity of the grain boundary over the entirety of the combined type RFeB-based magnet, and thus it is possible to increase the coercive force of the entirety of the magnet. Accordingly, it is possible to prevent magnetization inversion up to a high temperature in comparison to the combined type RFeB-based magnet in the related art, and thus the combined type RFeB-based magnet of the invention can be suitably used in magnets such as a magnet for a drive motor of a vehicle which is used in an environment in which a temperature is raised to a high temperature of approximately 200° C.

The combined type RFeB-based magnet according to the invention also has an effect of suppressing an occurrence of an eddy current during use when considering that all of the carbide, the hydroxide, and the oxide of the light rare earth element $R^L$ that is a material of the interface material are insulating materials.

In the combined type RFeB-based magnet according to the invention and the method for producing the RFeB-based magnet, it is preferable that each bonding surface is a planar surface when considering that shape matching of bonding surfaces between adjacent unit magnets can be easily performed. In the producing method, it is preferable that the bonding surfaces are planar surfaces when considering that the paste can be easily attached to the bonding surfaces.

The second unit magnet may be disposed on a surface side of the combined type RFeB-based magnet. Alternatively, the second unit magnet may be disposed at an end portion or a corner portion of a plate-shaped combined type RFeB-based magnet.

In the combined type RFeB-based magnet according to the invention, a squareness ratio, which is defined by $H_k/H_{cj}$ that is a ratio of a magnetic field $H_k$ corresponding to 90% of the residual magnetic flux density $B_r$ to a coercive force $H_{cj}$ in a second quadrant of a magnetization curve, is preferably 90% or more, and more preferably 95% or more. When the squareness ratio is in the above-described range, the combined type RFeB-based magnet of the invention can be suitably used in magnets such as a magnet for a drive motor of a vehicle which is used in an environment in which a temperature is raised to a high temperature of approximately 200° C. To obtain the combined type RFeB-based magnet having a preferred squareness ratio, a composition of the first unit magnet and the second unit magnet, and the like may be appropriately set. However, the heavy rare earth element $R^H$ is a rare resource and is expensive, and thus it is preferable that a volume ratio of the second unit magnet is as small as possible in a range capable of accomplishing the object of the invention. For example, in a case where an amount of the heavy rare earth element $R^H$ in the first unit magnet is 0% by mass to 2.0% by mass, and an amount of the heavy rare earth element $R^H$ in the second unit magnet is 2.0% by mass to 5.0% by mass, it is preferable that the volume ratio of the second unit magnet is 35% or less of the entirety of the combined type RFeB-based magnet, more preferably 20% or less, and still more preferably 15% or less.

According to the invention, it is possible to provide an RFeB-based magnet which is capable of locally increasing a content rate of $R^H$ at a portion in which it is necessary to increase a coercive force, and which has high heat resistance.

DETAILED DESCRIPTION OF THE INVENTION

Examples of a combined type RFeB-based magnet according to the invention and a method for producing the combined type RFeB-based magnet will be described with reference to FIGS. 1A to 7B.

EXAMPLES

Figure 1A:
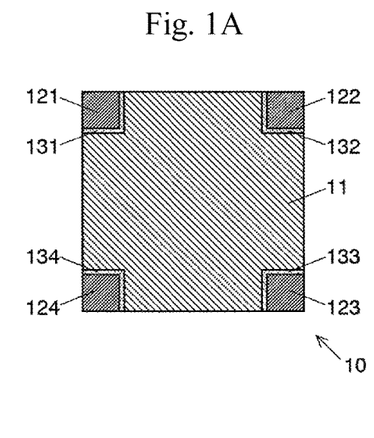
FIGS. 1A and 1B are a top view and a perspective view (FIG. 1B) which illustrate an example of a combined type RFeB-based magnet according to the invention.
Figure 1B:
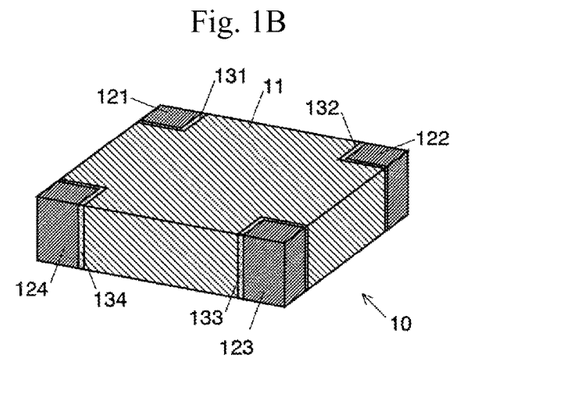

FIGS. 1A and 1B illustrate a combined type RFeB-based magnet 10 that is an example of the combined type RFeB-based magnet according to the invention. The combined type RFeB-based magnet 10 of this example has a square plate shape as a whole, and is configured in such a manner that one first unit magnet 11 and four second unit magnets 121 to 124 which have a square planar shape and are the same size are bonded to each other. The first unit magnet 11 has a cross shape obtained by respectively cutting off four square planar corner portions of the combined type RFeB-based magnet 10 by a portion corresponding to each of the second unit magnets 121 to 124. These unit magnets are formed from a sintered magnet. In this example, as the first unit magnet 111 and the second unit magnets 121 to 124, a magnet containing Dy as the $R^H$ was used. An amount of the $R^H$ (Dy) is larger in the first unit magnet 11 in comparison to the second unit magnets 121 to 124. Bonding surfaces of the first unit magnet 11 and the four second unit magnets 121 to 124 are planar surfaces that are perpendicular to a flat plate surface of the combined type RFeB-based magnet 10, and interface materials 131 to 134 are provided to the bonding surfaces, respectively. The interface materials 131 to 134 contain an oxide of Nd that is the light rare earth element $R^L$.

As described above, the combined type RFeB-based magnet 10 provided with portions (second unit magnets 121 to 124), in which a content rate of the heavy rare earth element $R^H$ is high, at four corner portions thereof may be used in a state in which a plurality of the combined type RFeB-based magnets 10 are disposed at a rotor of a motor along a rotation direction thereof. In this case, it is possible to increase a coercive force at end portions of the magnet at which a magnetic field dramatically fluctuates during rotation of the rotor. According to this, it is possible to prevent magnetization inversion.

Figure 2A:
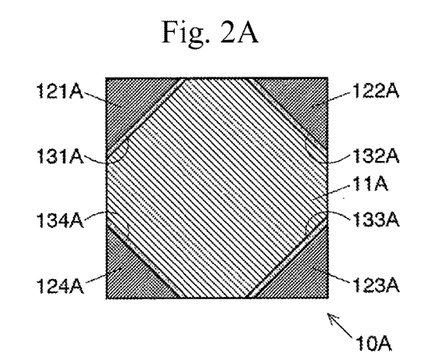
FIGS. 2A to 2C are top views illustrating a modification example of the combined type RFeB-based magnet of this example.

FIGS. 2A to 2C illustrate a modification example of the above-described example. In a combined type RFeB-based magnet 10A that is shown in FIG. 2A, second unit magnets 121A to 124A that have a planar shape of an isosceles right triangle are used instead of the second unit magnets 121 to 124 having the square planar shape. A planar shape of the first unit magnet 11A is set to an octagon in correspondence with the shape of the second unit magnets 121A to 124A. Interface materials 131A to 134A are provided to interfaces of the first unit magnet 11A and the second unit magnets 121A to 124A.

Figure 2B:
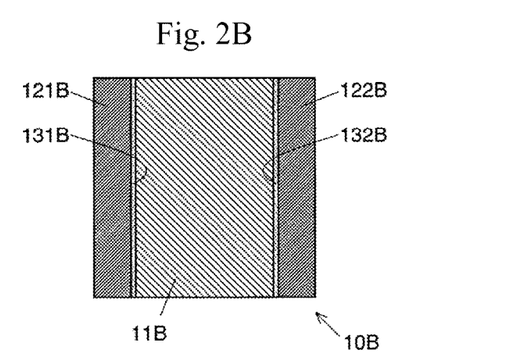

In a combined type RFeB-based magnet 10B shown in FIG. 2B, second unit magnets 121B and 122B having a rectangular shape are bonded to two long sides of a first unit magnet 11B having a rectangular planar shape. The combined type RFeB-based magnet 10B has a square planar shape. Interface materials 131B and 132B are provided to interfaces of the first unit magnet 11B and the second unit magnets 121B and 122B.

Figure 2C:
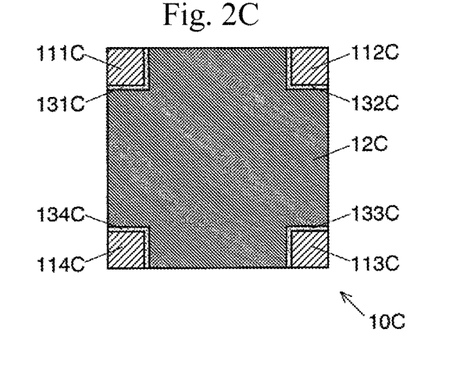

In a combined type RFeB-based magnet 10C shown in FIG. 2C, four first unit magnets 111C to 114C which have a square planar shape and are the same size and a second unit magnet 12C having a cross shape are bonded to each other. The combined type RFeB-based magnet 10C exactly has a configuration in which the material of the first unit magnet and the material of the second unit magnets in the above-described combined type RFeB-based magnet 10 are replaced with each other.

Next, a method for producing the combined type RFeB-based magnet 10 of this example will be described with reference to FIGS. 3A to 3F.

First, the first unit magnet 11 and the second unit magnets 121 to 124 were prepared by using the method described in Patent Document 3 in accordance with the following method. In the method described in Patent Document 3, a sintered magnet is prepared without compression-molding an alloy powder of a raw material, and thus the method is called a PLP (Press-less Process) method. Since the compression molding is not performed, the PLP method has an advantage that a coercive force can be improved while suppressing a decrease in residual magnetic flux density, and a sintered magnet with a complicated shape can be easily manufactured.

Specifically, first, strip cast alloys having a similar composition were prepared for the first unit magnet 11 and the second unit magnets 121 to 124 to be prepared. In this example, the strip cast alloy for the first unit magnet 11 was set to have a composition of Nd: 25.4% by mass, Dy: 0.7% by mass, B: 0.99% by mass, and Fe: the remainder, and the strip cast alloy for the second unit magnets 121 to 124 was set to have a composition of Nd: 23.1% by mass, Pr: 4.7% by mass, Dy: 3.2% by mass, Co: 0.9% by mass, Al: 0.2% by mass, Cu: 0.1% by mass, B: 0.99% by mass, and Fe: the remainder.

Figure 3A:
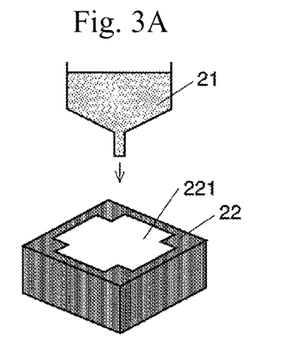
FIGS. 3A to 3F are schematic views illustrating a method for producing the combined type RFeB-based magnet of this example.
Figure 3B:
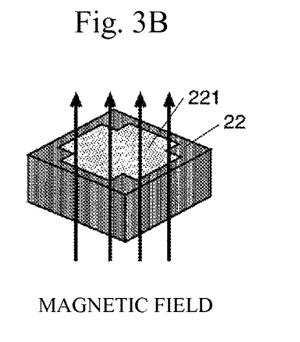

Each of the strip cast alloys was hydrogen-crushed, and was finely pulverized with a jet mill, thereby preparing an alloy powder 21 having an average particle size, which is a value measured by a laser method, of 0.1 μm to 10 μm (preferably 3 μm to 5 μm). Next, the alloy powder was filled in a cavity 221 of a mold 22 which has the same shape as that of each of the unit magnets and a size larger than that of the unit magnet (FIG. 3A), and the alloy powder 21 in the cavity 221 was oriented in a magnetic field without compression (FIG. 3B). In addition, in FIGS. 3A to 3F, the cavity 221 corresponding to the shape of the first unit magnet 11 is shown, but with regard to the second unit magnets 121 to 124, a mold having a cavity corresponding to the shape of the unit magnets may be used.

Figure 3C:
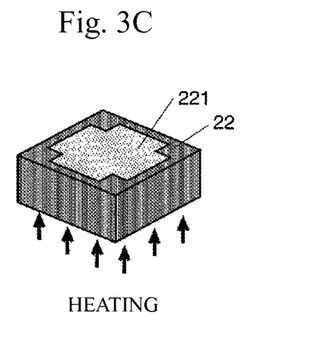

Then, heating was performed (a heating temperature was typically 950° C. to 1050° C.) in a state in which the alloy powder 21 was filled in the cavity 221 without compression, thereby sintering the alloy powder 21 (FIG. 3C). According to this, the first unit magnet 11 and the second unit magnets 121 to 124 were obtained.

Figure 3D:
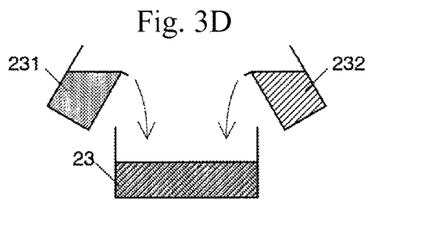

Independently from the preparation of the unit magnets, an $R^H$-containing paste 23 for bonding of unit magnets was prepared by mixing an $R^H$-containing metal powder 231 containing the heavy rare earth element $R^H$ and silicone grease 232 as an organic material (FIG. 3D).

As the $R^H$-containing metal powder 231, a powder of a TbNiAl alloy having a content rate of Tb: 92% by mass, Ni: 4.3% by mass, and Al: 3.7% by mass was used. It is preferable that a particle size of the $R^H$-containing metal powder 231 is as small as possible for uniform diffusion into the unit magnets, but when the particle size is too small, effort and cost for miniaturization increase. Therefore, it is preferable that the particle size is set to 2 μm to 100 μm. The silicone grease 232 has a function of oxidizing atoms of $R^H$ in the paste during the grain boundary diffusion treatment when considering that the silicone is a polymeric compound having a main skeleton formed by a siloxane bond of a silicon atom and an oxygen atom. A mixing ratio by weight of the $R^H$-containing metal powder 231 and the silicone grease 232 may be arbitrarily selected for adjustment of a desired paste viscosity. However, when the ratio of the $R^H$-containing metal powder 231 is low, an amount of penetration of the $R^H$ atoms into the unit magnet also decreases during the grain boundary diffusion treatment. Therefore, it is preferable that the ratio of the $R^H$-containing metal powder 231 is set to 70% by mass or more, more preferably 80% by mass or more, and still more preferably 90% by mass or more. In addition, when the amount of the silicone grease 232 is less than 5% by mass, sufficient pasting does not occur, and thus the amount of the silicone grease 232 is preferably 5% by mass or more. Furthermore, in addition to the silicone grease 232, silicon fluid, liquid hydrocarbon such as flowable paraffin and hexane, and the like may be added to adjust the viscosity of the $R^H$-containing paste 23.

Figure 3E:
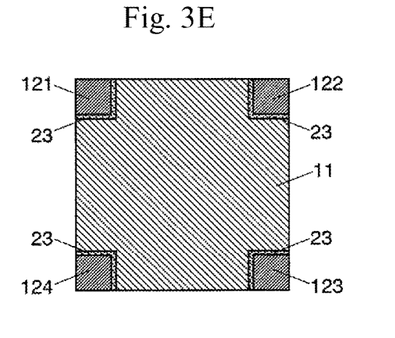
Figure 3F:
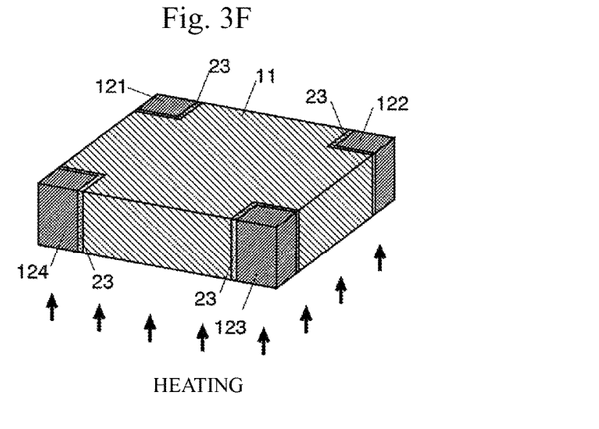

The $R^H$-containing paste 23 was applied to the bonding surfaces of the first unit magnet 11 and the second unit magnets 121 to 124, and the second unit magnets 121 to 124 were brought into contact with the first unit magnet 11 through the $R^H$-containing paste 23 (FIG. 3E). In this state, the unit magnets were heated at 900° C. in a vacuum atmosphere (FIG. 3F). According to this heating, the Tb atoms in the $R^H$-containing paste 23 diffuse to the inside of the first unit magnet 11 and the second unit magnets 121 to 124 through a grain boundary. According to this diffusion, Nd atoms and/or Pr atoms ($R^L$ atoms) that are contained in at least one of the first unit magnet 11 and the second unit magnets 121 to 124 are substituted with Tb atoms. At least a part of the substituted $R^L$ atoms reacts with an oxygen atom in silicone contained in the $R^H$-containing paste 23 that is interposed between the first unit magnet 11 and the second unit magnets 121 to 124, and thus the interface materials 131 to 134 that contain oxides of the $R^L$ are formed. In this manner, it is possible to obtain the combined type RFeB-based magnet 10 in which the first unit magnet 111 and the second unit magnets 121 to 124 are strongly bonded to each other by the interface materials 131 to 134.

As described above, in the method for producing the combined type RFeB-based magnet 10 of this example, since the grain boundary diffusion treatment can be performed simultaneously with the bonding of the unit magnets, it is possible to increase the coercive force of the combined type RFeB-based magnet 10 as a whole. In addition, in a typical grain boundary diffusion treatment heating is performed in a state in which the $R^H$-containing powder or the like is attached to a surface of a magnet, and thus unevenness due to residues of the powder is generated after the process. As a result, it is necessary to remove the residues. In contrast, in the method of this example, since the $R^H$-containing paste 23 that is used in the grain boundary diffusion treatment does not remain on a surface of the combined type RFeB-based magnet 10, it is not necessary to remove the $R^H$-containing paste 23, and the $R^H$-containing paste 23 is effectively used as the interface materials 131 to 134.

Next, with regard to the combined type RFeB-based magnet 10 of this example, parameters of samples that were prepared and measurement results of the magnetic properties are shown in Table 1.

TABLE 1

Samples that were prepared, and magnetic properties thereof

| Samples | Structure | Volume ratio of Second unit magnets [%] | Residual magnetic flux density $B_r$ [kG] | Coercive force $H_{cJ}$ [kOe] | Degree of orientation [%] | Squareness ratio [%] |
|---|---|---|---|---|---|---|
| Reference Example 1 | (Non-combined type) | 0 | 12.73 | 25.46 | 96.5 | 95.5 |
| Example 1 | 10 | 11 | 12.63 | 25.48 | 96.4 | 95.1 |
| Example 2 | 10A | 22 | 12.59 | 26.44 | 96.3 | 90.7 |
| Example 3 | 10B | 33 | 12.63 | 26.63 | 96.7 | 90.6 |

TABLE 1-continued

Samples that were prepared, and magnetic properties thereof

| Samples | Structure | Volume ratio of Second unit magnets [%] | Residual magnetic flux density $B_r$ [kG] | Coercive force $H_{cj}$ [kOe] | Degree of orientation [%] | Squareness ratio [%] |
|---|---|---|---|---|---|---|
| Example 4 | 10 | 44 | 12.49 | 28.36 | 96.1 | 84.9 |
| Example 5 | 10C | 56 | 12.42 | 28.35 | 96.2 | 86.6 |
| Example 6 | 10C | 89 | 12.35 | 30.98 | 96.3 | 78.7 |
| Reference Example 2 | (Non-combined type) | 100 | 12.17 | 31.15 | 96.2 | 95.0 |

In table 1, reference numerals described in a column of "Structure" represent reference numbers of the combined type RFeB-based magnets 10, 10A, 10B, and 10C. The respective samples have structures corresponding to the reference numerals (refer to FIGS. 1A to 2C). A numerical value described in "Volume ratio of second unit magnets" represents a volume ratio of the second unit magnets which is occupied in the entirety of the combined type RFeB-based magnet. In addition, Reference Example 1 is a typical magnet (not combined type) that is prepared only by the material of the first unit magnet, and Reference Example 2 is a typical magnet that is prepared only by the material of the second unit magnets. "Degree of orientation" is defined by a value $(J_r/J_s)$ obtained by dividing a measurement value $J_r$ of residual magnetic polarization by saturated magnetic polarization $J_s$ that is a theoretical maximum magnetic polarization. "Squareness ratio" is defined by a ratio $(H_k/H_{cj})$ that is a ratio of a magnetic field $H_k$ corresponding to 90% of the residual magnetic flux density $B_r$ to a coercive force $H_{cj}$ in a second quadrant of a magnetization curve.

From Table 1, it can be said that in samples of Examples 1 to 6, the residual magnetic flux density $B_r$ does not decrease so much in comparison to a sample of Reference Example 1 in which the amount of $R^H$ is the smallest. In addition, in all samples of Examples 1 to 6, as a coercive force, a value as high as 25 kOe is obtained. The further the volume ratio of the $R^H$ increases, the further the squareness ratio deteriorates. However, in samples of Examples 1 to 3 in which the volume ratio of the second unit magnets is 35% or less, a value as high as 90% or more is obtained, and particularly, in a sample of Example 1 in which the volume ratio of the second unit magnets is 15% or less, a value as high as 95% or more is obtained.

The invention is not limited to the above-described example. For example, in the example, a sintered magnet is used as all of the first unit magnet and the second unit magnets, but a hot-plastic worked magnet may be used. In addition, in the example, two kinds of unit magnets in which amounts of Dy are different from each other are used, but two kinds of unit magnets in which amounts of Tb and/or Ho instead of Dy or in combination with Dy are different from each other may be used. In addition, three or more kinds of unit magnets in which amounts of $R^H$ are different from each other may be used. In each of the interface materials, a hydroxide and/or a carbide of $R^L$ may be used instead of the oxide of $R^L$ or in combination with the oxide. In addition, a metal powder that contains Dy and/or Ho instead of Tb or in combination with Tb may be used as the $R^H$-containing metal powder.

In the example, the second unit magnets are provided at four square corner portions of the combined type RFeB-based magnet. However, for example, the second unit magnets may be provided only at two corner portions corresponding to the rotation front side of a rotor of a motor. In addition, in the example, the bonding surface is set to a planar surface, but may be a curved surface.

Figure 4:
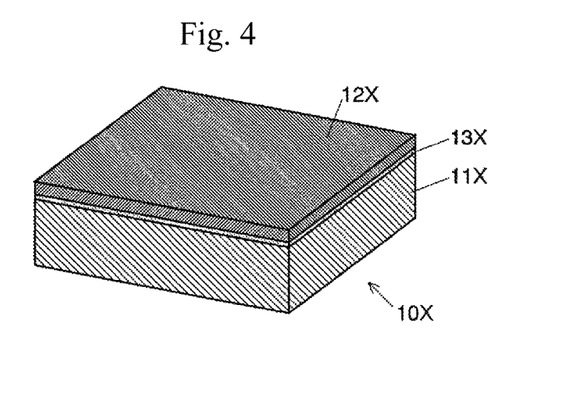
FIG. 4 is a perspective view illustrating a modification example of the combined type RFeB-based magnet of this example.

The shape of the combined type RFeB-based magnet and the respective unit magnets is also not limited to the example. For example, with regard to the shape of the combined type RFeB-based magnet, a plate-shaped magnet having a rectangular shape or other shapes may be used. In addition, as shown in FIG. 4, plate-shaped first and second unit magnets 11X and 12X in which a shape of a planar surface is the same may be bonded to each other at the planar surface by using an interface material 13X. In a motor, when this combined type RFeB-based magnet 10X is mounted on a rotor in a state in which the second unit magnet 12X faces a stator side, it is possible to increase a coercive force at a position that is close to a stator in which a magnetic field is relatively strong.

Figure 5A:
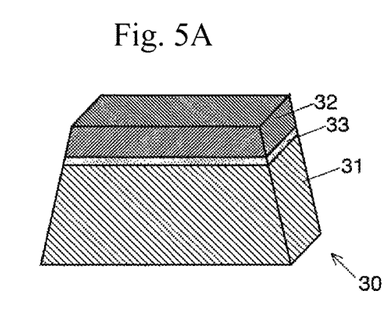
FIGS. 5A and 5B are perspective views illustrating another example of the combined type RFeB-based magnet according to the invention.
Figure 5B:
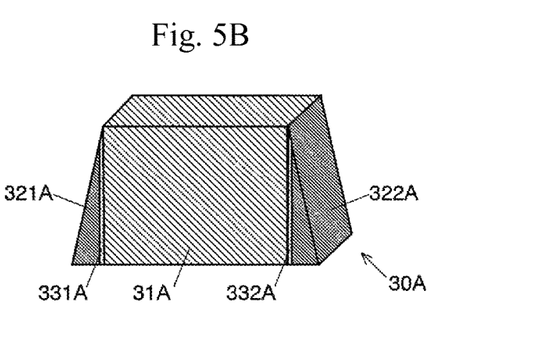

As another example of the shape of the combined type RFeB-based magnet, as shown in FIGS. 5A and 5B, combined type RFeB-based magnets 30 and 30A which have a trapezoidal cross-section may be exemplified. In the combined type RFeB-based magnet 30 shown in FIG. 5A, unit magnets, which are obtained by dividing the combined type RFeB-based magnet 30 into two pieces in a horizontal direction, are used, and a unit magnet on a lower-side side of a trapezoid is set as a first unit magnet 31, and a unit magnet on an upper-side side is set as a second unit magnet 32. The first unit magnet 31 and the second unit magnet 32 are bonded to each other by an interface material 33. The combined type RFeB-based magnet 30 exhibits the same effect as the above-described combined type RFeB-based magnet 10X.

Alternatively, as shown in FIG. 5B, a combined type RFeB-based magnet 30A, which has a trapezoidal cross-section and in which second unit magnets 321A and 322A are used in the vicinity of both right and left end portions of a trapezoid and a first unit magnet 31A is used between the second unit magnets 321A and 322A, is also included in the invention. The second unit magnets 321A and 322A are bonded to the first unit magnet 31A by interface materials 331A and 332A, respectively. In general, in a magnet with this shape, a thickness of the trapezoid in the vicinity of both end portions thereof is smaller than that of other portions, and thus a demagnetizing field that is formed by magnetization polarization becomes strong, and a coercive force at the portions decreases. However, in the combined type RFeB-based magnet 30A of this example, the second unit magnet 321A and 322A are used at the portions, and thus it is possible to suppress a decrease in the coercive force.

Figure 6A:
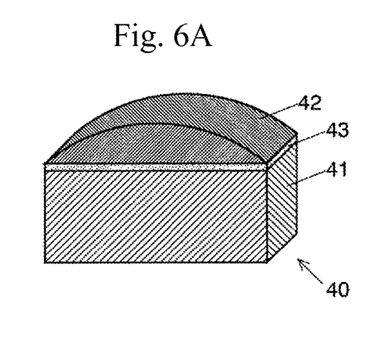
FIGS. 6A and 6B are perspective views illustrating another example of the combined type RFeB-based magnet according to the invention.
Figure 6B:
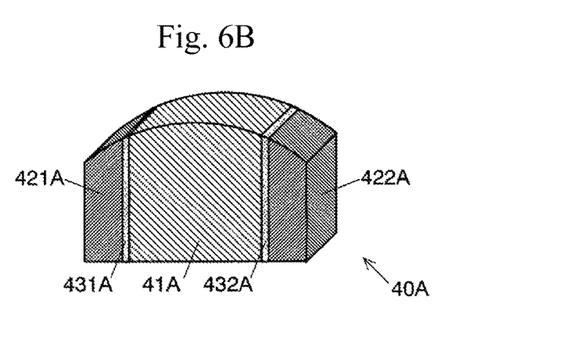

As another example of the shape of the combined type RFeB-based magnet, as shown in FIGS. 6A and 6B, a rectangular parallelepiped shape which has an arc surface (surface having a radius of curvature in only one direction) only in one surface may be exemplified. For example, a combined type RFeB-based magnet 40 shown in FIG. 6A has a configuration in which in unit magnets obtained by dividing the combined type RFeB-based magnet 40 into two pieces in a horizontal direction, a unit magnet on an arc surface side is set as a second unit magnet 42, a unit magnet on the other side is set as a first unit magnet 41, and the first and second unit magnets 41 and 42 are bonded to each other by an interface material 43. In addition, a combined type RFeB-based magnet 40A shown in FIG. 6B has a configuration in which second unit magnets 421A and 422A are used in the vicinity of both end portions of an arc, a first unit magnet 41A is disposed therebetween, and the first unit magnet 41A and the second unit magnets 421A and 422A are bonded to each other by interface materials 431A and 432A, respectively. The combined type RFeB-based magnets 40 and 40A have the same effect as the above-described combined type RFeB-based magnets 30 and 30A.

Figure 7A:
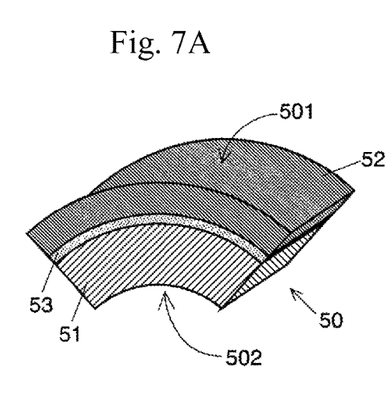
FIGS. 7A and 7B are perspective views illustrating another example of the combined type RFeB-based magnet according to the invention.
Figure 7B:
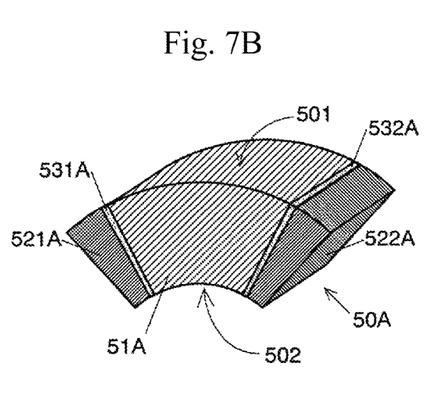

As another example of the shape of the combined type RFeB-based magnet, as shown in FIGS. 7A and 7B, a fan surface body having a fan surface body shape including a first arc surface 501 and a second arc surface 502 that is opposite to the first arc surface 501 may be exemplified. For example, a combined type RFeB-based magnet 50 shown in FIG. 7A has a configuration in which first and second unit magnets 51 and 52 obtained by dividing the fan surface body on an arc surface between the first arc surface 501 and the second arc surface 502 are bonded to each other by an interface material 53. In addition, bonding surfaces of the first unit magnet 51 and the second unit magnet 52 do not intersect the first arc surface 501 and the second arc surface 502. In addition, the first arc surface 501 and the second arc surface 502 may be a concentric arc or may not be a concentric arc at a cross-section. A combined type RFeB-based magnet 50A shown in FIG. 7B has a configuration in which second unit magnets 521A and 522A are used in the vicinity of both end portions of the first arc surface 501 and the second arc surface 502, a first unit magnet 51A is disposed between the second unit magnets 521A and 522A, and the first unit magnet 51A and the second unit magnets 521A and 522A are bonded to each other by interface materials 531A and 532A. The combined type RFeB-based magnets 50 and 50A exhibit the same effect as the above-described combined type RFeB-based magnets 30 and 30A, respectively.

While the mode for carrying out the present invention has been described in detail above, the present invention is not limited to these embodiments, and various changes and modifications can be made therein without departing from the purport of the present invention.

This application is based on Japanese patent application No. 2013-208936 filed Oct. 4, 2013, the entire contents thereof being hereby incorporated by reference.

DESCRIPTION OF REFERENCE NUMERALS AND SIGNS 10, 10A, 10B, 10C, 10X, 30, 30A, 40, 40A, 50, 50A: Combined type RFeB-based magnet
11, 11A, 11B, 111C to 114C, 11X, 31, 31A, 41, 41A, 51, 51A: First unit magnet
121 to 124, 121A to 124A, 121B, 122B, 12C, 12X, 32, 321A, 322A, 42, 421A, 422A, 52, 521A, 522A: Second unit magnet
131 to 134, 131A to 134A, 131B, 132B, 131C to 134C, 13X, 33, 331A, 332A, 43, 431A, 432A, 53, 531A, 532A: Interface material
21: Alloy powder
22: Mold
221: Cavity
23: $R^H$-containing paste
231: $R^H$-containing metal powder
232: Silicone grease
501: First arc surface
502: Second arc surface

What is claimed is:

1. A combined RFeB-based magnet, comprising:
a first unit magnet;
a second unit magnet; and
an interface material that bonds the first unit magnet and the second unit magnet,
wherein the first unit magnet and the second unit magnet are RFeB-based magnets containing a light rare earth element $R^L$ that is at least one element selected from the group consisting of Nd and Pr, Fe, and B,
wherein the interface material contains at least one compound selected from the group consisting of a carbide, a hydroxide, and an oxide of the light rare earth element $R^L$, and
wherein an amount of a heavy rare earth element $R^H$ that is at least one element selected from the group consisting of Dy, Tb and Ho in the first unit magnet is 0% by mass to less than 2.0% by mass and an amount of the heavy rare earth element $R^H$ in the second unit magnet is 2.0% by mass to 5% by mass,
wherein a squareness ratio $H_k/H_{cj}$ that is a ratio of a magnetic field $H_k$ corresponding to 90% of a residual magnetic flux density $B_r$ to a coercive force $H_{cj}$ in a second quadrant of a magnetization curve is 90% or more, and
wherein a volume ratio of the second unit magnet to the combined RFeB-based magnet is 35% or less.

2. The combined RFeB-based magnet according to claim 1,
wherein bonding surfaces of the first unit magnet and the second unit magnet are planar surfaces.

3. The combined RFeB-based magnet according to claim 1,
wherein the second unit magnet is disposed on a surface side of the combined RFeB-based magnet.

4. The combined RFeB-based magnet according to claim 1,
wherein the combined RFeB-based magnet is plated-shaped and the second unit magnet is disposed at an end portion or a corner portion of the plated-shaped combined RFeB-based magnet.

5. A method for producing the combined RFeB-based magnet of claim 1, comprising:
a grain boundary diffusion treatment step of heating in a state in which bonding surfaces of the first unit magnet and the second unit magnet are brought into contact with each other through paste obtained by mixing a metal powder containing the heavy rare earth element $R^H$ and an organic material.

6. The method for producing the combined RFeB-based magnet according to claim 5,
wherein the bonding surfaces are planar surfaces.

* * * * *